(12) United States Patent
Solda et al.

(10) Patent No.: US 6,398,488 B1
(45) Date of Patent: Jun. 4, 2002

(54) INTERSTAGE SEAL COOLING

(75) Inventors: Robert Barry Solda, Peabody; Robert Francis Manning, Newburyport; David Gellman, Peabody, all of MA (US)

(73) Assignee: General Electric Company, Schenectady, NY (US)

( * ) Notice: Subject to any disclaimer, the term of this patent is extended or adjusted under 35 U.S.C. 154(b) by 17 days.

(21) Appl. No.: 09/660,572

(22) Filed: Sep. 13, 2000

(51) Int. Cl.[7] ................................................. F03B 11/00
(52) U.S. Cl. ..................................... 415/115; 415/173.7
(58) Field of Search .............................. 415/173.7, 111, 415/112, 115, 116, 180, 174.4, 174.5

(56) References Cited

U.S. PATENT DOCUMENTS

| | | | | |
|---|---|---|---|---|
| 3,511,577 A | * | 5/1970 | Karstensen | 415/137 |
| 3,945,758 A | * | 3/1976 | Lee | 415/144 |
| 5,215,435 A | * | 6/1993 | Webb et al. | 415/173.7 |
| 5,358,374 A | * | 10/1994 | Correia et al. | 415/47 |
| 5,488,825 A | * | 2/1996 | Davis et al. | 60/39.75 |
| 5,609,466 A | * | 3/1997 | North et al. | 415/115 |
| 5,749,701 A | * | 5/1998 | Clarke et al. | 415/115 |
| 6,065,928 A | * | 5/2000 | Rieck, Jr. et al. | 415/115 |

OTHER PUBLICATIONS

GE Aircraft Engines, "CF34–3B," in commercial use in U.S. for more than a year, single page drawing excerpt.

* cited by examiner

Primary Examiner—Edward K. Look
Assistant Examiner—Richard Edgar
(74) Attorney, Agent, or Firm—William S. Andes; Francis L. Conte

(57) ABSTRACT

A turbine nozzle includes a seal pad mounted to a seal support from an inner band thereof. The seal pad is provided for cooperating with seal teeth in an interstage seal. A bypass aperture extends through the seal support to bypass cooling air around the seal pad for providing relatively cool air aft of the seal teeth for improving cooling of the interstage seal in this region.

20 Claims, 2 Drawing Sheets

INTERSTAGE SEAL COOLING

BACKGROUND OF THE INVENTION

The present invention relates generally to gas turbine engines, and, more specifically, to cooling of interstage seals.

In a gas turbine engine, air is pressurized in a compressor and mixed with fuel in a combustor and ignited for generating hot combustion gases. The gases flow downstream through turbine stages which extract energy therefrom for powering the compressor and providing output power such as rotating a fan in a turbofan aircraft engine, for example. A high pressure turbine (HPT) powers the compressor, and a low pressure turbine (LPT) powers the fan with corresponding rotor shafts therebetween.

The HPT may include one or more turbine stages, and in a typical configuration two rows of turbine blades cooperate with corresponding turbine nozzles for extracting energy from the hottest combustion gases discharged from the combustor for powering the compressor. The rotor blades extend outwardly from corresponding rotor disks which are interconnected with each other and with the compressor for rotation therewith.

The second stage turbine nozzle disposed between the first and second stages of rotor blades must be suitably sealed from the disks thereof for preventing loss of the combustion gases from the main flowpath through the stator vanes of the nozzles and rotor blades on the disks.

In a typical configuration, an interstage seal is located between the two disks and cooperates with the turbine nozzle for providing a fluid seal therebetween. The interstage seal is in the form of an annular disk having a plurality of seal teeth projecting radially outwardly which cooperate with a honeycomb seal pad supported from an inner band of the nozzle. The seal disk includes forward and aft seal arms or sleeves which abut the cooperating turbine disks for providing an effective seal therebetween.

The interstage seal rotates with the two disks during operation, with the seal teeth cooperating with the stationary seal pad of the nozzle to define labyrinth seals therewith for limiting fluid flow therebetween.

The interstage seal itself and adjoining components of the turbine disk must be suitably cooled during operation due to the heating effect of the combustion gases. Accordingly, air discharged from the compressor is suitably channeled through radial passages in the hollow nozzle vanes and discharged in a forward cavity or plenum defined between the nozzle inner band and the forward seal sleeve. This cooling air cools the components defining the forward plenum and then leaks through the labyrinth seal into an aft cavity or plenum defined between the nozzle inner band and the aft seal sleeve.

As turbine engines are being designed for additional increase in performance and efficiency, cooling air discharged from the compressor has a correspondingly higher temperature which reduces its ability to cool the HPT components including the interstage seal. This cooling air is channeled through the forward interstage plenum past the seal teeth and into the aft interstage plenum picking up heat therealong.

During normal operation of the engine, the radial gap between the seal teeth and the seal pad varies, and as this gap decreases the amount of cooling air leaking therethrough also decreases and in turn decreases the cooling in the aft interstage plenum.

Accordingly, the loss in cooling effectiveness in the aft interstage plenum is compounded by the initially higher temperature of the compressor discharge air, the reduction in flowrate of that air as the seal gap decreases during operation, and the heating of the cooling air itself as it flows past hot turbine components prior to reaching the aft interstage plenum.

Accordingly, it is desired to provide improved interstage seal cooling for solving these problems.

BRIEF SUMMARY OF THE INVENTION

A turbine nozzle includes a seal pad mounted to a seal support from an inner band thereof. The seal pad is provided for cooperating with seal teeth in an interstage seal. A bypass aperture extends through the seal support to bypass cooling air around the seal pad for providing relatively cool air aft of the seal teeth for improving cooling of the interstage seal in this region.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
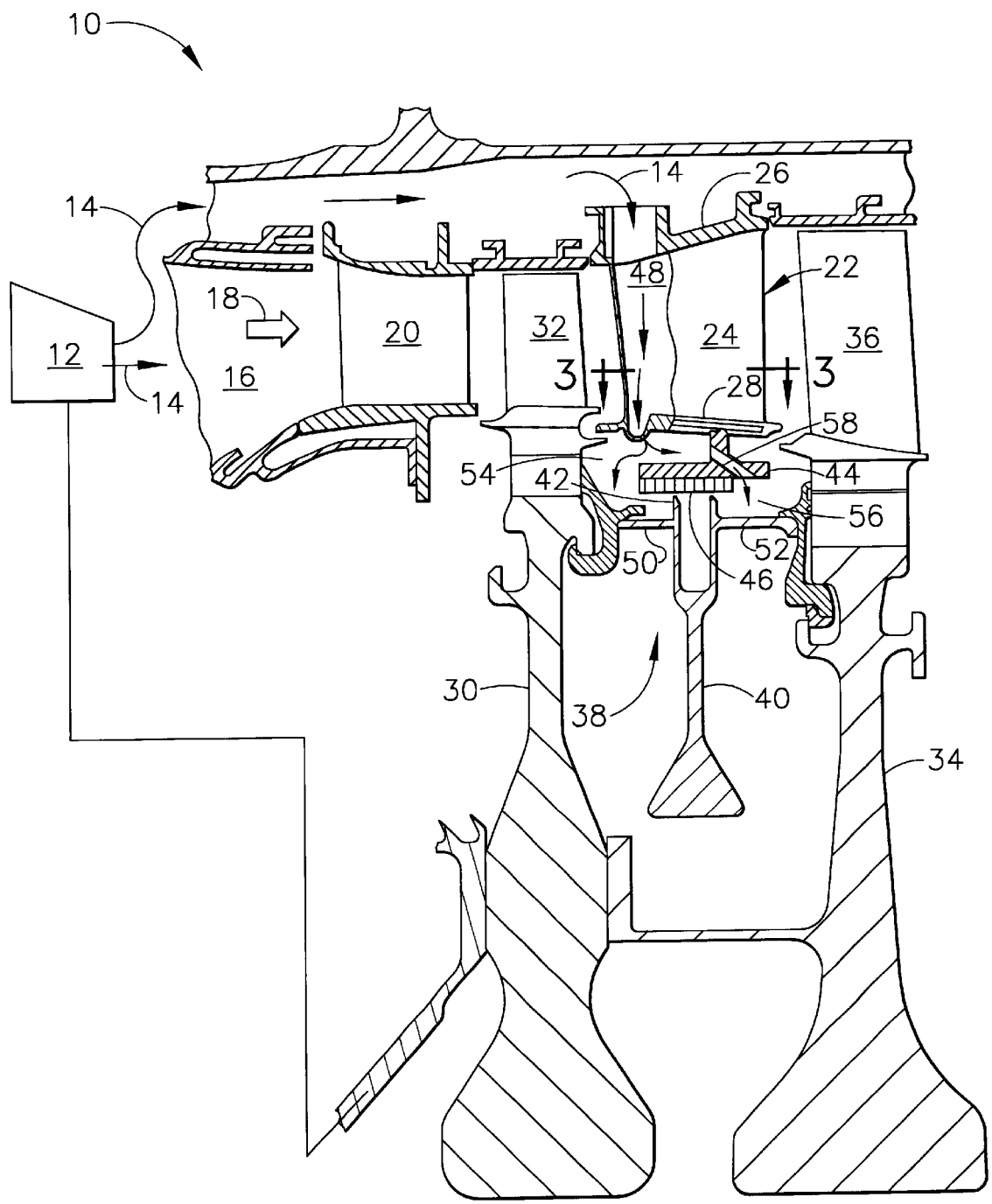
FIG. 1 is an axial sectional view through a portion of a high pressure turbine in a gas turbine engine having an interstage seal in accordance with an exemplary embodiment of the present invention.

Illustrated in FIG. 1 is a portion of a gas turbine engine 10 in the form of a turbofan engine configured for powering an aircraft in flight. The engine is axisymmetrical about a longitudinal or axial centerline axis and includes a fan (not shown) followed in turn by a multistage axial compressor 12 which pressurizes air 14 during operation.

Pressurized compressor discharge air flows downstream into an annular combustor 16, shown in aft part, wherein it is mixed with fuel and ignited for generating hot combustion gases 18. The combustion gases are discharged into a high pressure turbine (HPT) which extracts energy therefrom for powering the compressor 12 which is suitably joined thereto by a corresponding rotor shaft. The combustion gases then flow downstream into a low pressure turbine, not shown, which extracts additional energy therefrom for powering a fan in an exemplary embodiment.

The HPT illustrated in FIG. 1 is a two-stage turbine having cooperating turbine nozzles and rotors for extracting energy in turn as the combustion gases flow downstream therethrough. A first stage or high pressure turbine nozzle 20 is disposed at the outlet of the combustor and is conventionally configured with a row of stator vanes mounted between radially outer and inner bands for directing the combustion gases downstream therefrom.

A second stage turbine nozzle 22 is spaced downstream from the first stage nozzle 20 and includes a plurality of circumferentially spaced apart stator vanes 24 extending radially between outer and inner bands 26,28 in an integral assembly typically formed by casting.

A first stage or forward rotor disk 30 is disposed axially between the two nozzles 20,22 and includes a row of rotor blades 32 extending radially outwardly from the perimeter or rim thereof in a conventional manner.

A second stage or aft rotor disk 34 is disposed aft of the second stage nozzle 22 and includes a row of rotor blades 36 extending radially outwardly from the perimeter or rim thereof in a conventional manner. The two rotor disks 30,34 are conventionally interconnected to each other and to the compressor 12 through a corresponding rotor shaft for rotating the blades of the compressor as energy is extracted from the combustion gases by the turbine blades 32,36.

The flowpath for the combustion gases 18 extends from the combustor and downstream through the nozzle vanes and rotor blades in turn. The radially outer and inner boundaries of the flowpath are defined in part by the corresponding outer and inner bands of the nozzles. The flowpath is also defined in part by the root platforms at the radially inner ends of the rotor blades and by cooperating turbine shrouds disposed closely adjacent to the radially outer tip ends of the blades in a conventional manner.

Since the blades rotate during operation while the nozzle vanes are stationary, axial gaps are found therebetween which are suitably sealed during operation to minimize combustion gas leakage therebetween during operation.

For example, an interstage seal 38 is located axially between the two rotor disks 30,34 and radially below the second stage nozzle 22 to seal the inner end of the nozzle for maintaining a suitable pressure drop axially across the vanes 24 for effective operation. The interstage seal includes a seal rotor 40 in the form of a disk which includes a plurality of rotor seal teeth 42 extending radially outwardly. A seal support 44 extends radially inwardly from the inner band 28 of the second stage nozzle in an integral portion thereof typically formed in a unitary casting therewith.

The seal support 44 extends circumferentially or laterally along the underside of the inner band for supporting a stator seal pad 46 which may have any conventional configuration such as a lightweight honeycomb metal.

The seal teeth 42 are disposed closely adjacent to the seal pad 46 for effecting labyrinth seals therewith for minimizing or limiting fluid flow therebetween.

In the preferred embodiment illustrated in FIG. 1, the second stage vanes 24 are hollow and include a flow passage 48 extending radially therethrough as well as through the outer and inner bands 26,28 in a conventional manner. The flow passage 48 is suitably joined to the discharge end of the compressor 12 for receiving therefrom a portion of the compressor discharge air 14 having maximum pressure. The cooling air is channeled through the vanes 24 for cooling thereof, and a portion of which is discharged through the inner band for cooling the interstage seal 38 and adjacent components.

The seal rotor 40 is itself imperforate for blocking fluid flow therethrough, and further includes an annular or tubular forward seal arm or sleeve 50 extending axially forwardly from a forward one of the seal teeth 42. And, an annular aft seal arm or sleeve 52 extends axially aft from an aft one of the seal teeth 42.

The seal rotor 40 and its integral components may have any conventional configuration, with the forward sleeve 50 being joined in abutment with the forward disk 30, typically at a corresponding annular blade retainer attached thereto. The aft sleeve 52 is similarly joined in abutment with the aft disk 34 at a corresponding annular blade retainer attached thereto. In this way, the seal rotor 40 and its seal sleeves 50,52 provide a sealed barrier between the corresponding rims of the two disks 30,34 and prevent fluid flow radially outwardly thereat of cooling air used to cool the two disks and blades.

In the exemplary embodiment illustrated in FIG. 1, the forward sleeve 50 is spaced radially inwardly from the seal pad 46 to define a forward seal cavity or plenum 54 for receiving the cooling air 14 discharged from the vanes through the inner band 28. This cooling air is then used for pressurizing the forward plenum 54 to prevent ingestion of the hot combustion gases therein, while also cooling the components surrounding the plenum.

The aft sleeve 52 is similarly spaced radially inwardly from the seal pad 46 to define an aft seal cavity or plenum 56 which conventionally receives cooling air from the forward plenum 54 through the small gaps of the labyrinth seal defined between the seal teeth 42 and the seal pad 46.

However, as indicated above higher performance gas turbine engines such as that illustrated in FIG. 1 have a higher pressure-ratio compressor for pressurizing the air 14 to greater pressures, with a correspondingly higher temperature thereof. The higher temperature compressor discharge air has a correspondingly reduced ability for cooling the hot turbine components through which it is channeled.

Although the cooling air 14 channeled through the forward plenum 54 has sufficient cooling capacity for cooling the turbine components in this region, cooling effectiveness of the air is reduced as it leaks past the seal teeth 42 and enters the aft plenum 56. This problem is compounded as the gap between the seal teeth and pad decreases during operation which reduces the flowrate of cooling air into the aft plenum 56, with the higher temperature of that cooling air having reduced ability for cooling the components surrounding the aft plenum 56.

In particular, it has been discovered that the aft seal sleeve 52 itself is subject to decreased cooling from the cooling air leaking through the labyrinth seals which would otherwise reduce the useful life thereof, but for the present invention.

More specifically, the turbine nozzle 22 illustrated in FIG. 1 is modified in according with the present invention for introducing a tubular bypass aperture 58 extending through the seal support 44 to preferentially bypass a portion of the cooling air 14 around the seal pad 46 to directly provide a portion of the relatively cool air being introduced into the forward plenum 54 in parallel into the aft plenum 56 without passing through the labyrinth seal itself.

Figure 2:
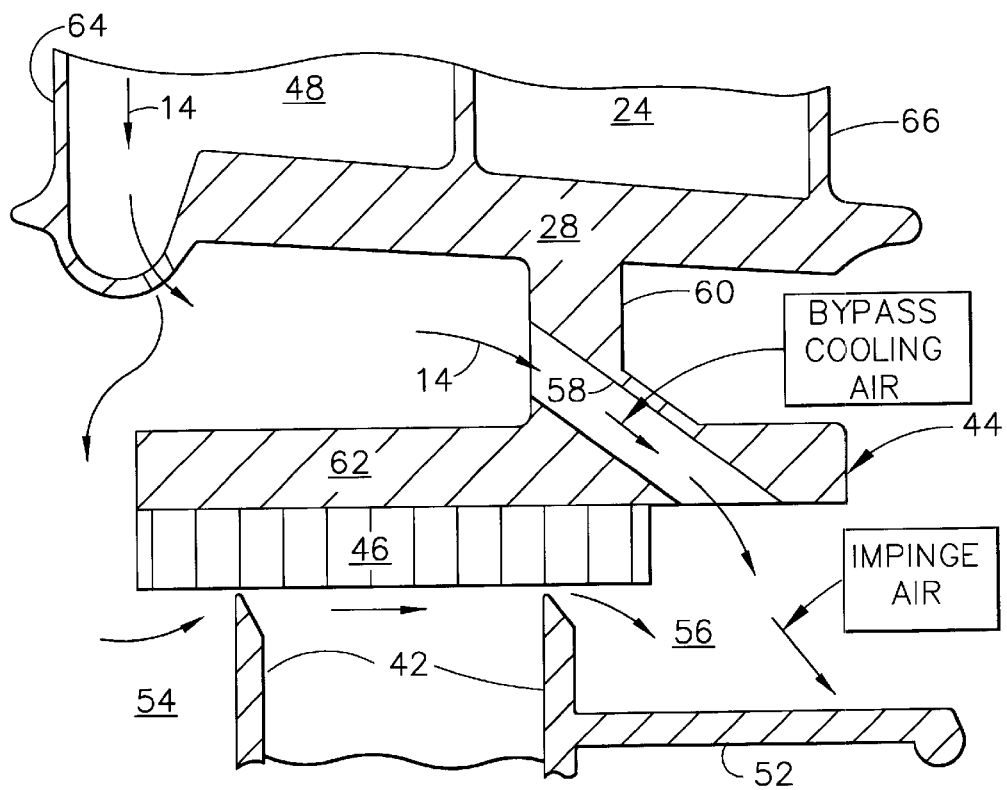
FIG. 2 is an enlarged axial sectional view through a portion of the interstage seal illustrated in FIG. 1 showing a bypass aperture for improving seal cooling in accordance with an exemplary embodiment.

The seal support 44 is illustrated in more detail in FIG. 2 and includes a radial flange or web 60 extending radially inwardly from the inner band 28 in the intermediate portion thereof between its forward and aft ends. An integral axially extending seal platform or land 62 is joined to the inner end of the web 60 in a unitary construction therewith preferably in the common casting with the inner band 28. The seal land 62 is spaced radially inwardly from the inner band 28 for supporting the seal pad 46 therebelow in close proximity to the seal teeth 42 for effecting the labyrinth seals therewith.

The bypass aperture 58 preferably extends through the web 60 and aft portion of the seal land 62 to bypass the cooling air 14 aft of the seal pad 46. The seal pad 46 may be axially truncated from the aft end of the seal land 42 for permitting an unobstructed outlet for the bypass aperture 58, but in an alternate embodiment the bypass aperture could also extend through an axially longer seal pad if desired.

The seal pad 46 is suitably fixedly joined to the inner side of the seal land 62 forwardly of the outlet of the bypass aperture 58 and extends axially over a majority of the seal land. The outlet of the bypass aperture 58 is also disposed aft of the seal teeth 42 for bypassing a portion of the cooling air around the labyrinth seals.

The bypass aperture 58 is suitably sized in diameter to be relatively small to bypass only a portion of the cooling air 14 around the seal land 62 and seal pad 46 to prevent comprising the sealing effectiveness thereof. During operation, a differential pressure exists between the forward and aft plenums 54, 56 with the pressure being higher in the former than in the latter which drives the cooling air through the small gap in the labyrinth seals.

This differential pressure also directly drives a portion of the cooling air through the bypass aperture 58 directly into the aft plenum 56 for enhancing the cooling effectiveness thereof without firstly passing through the labyrinth seals.

Since the bypass aperture 58 is preferably small in diameter and is subject to differential pressure thereacross during operation, the cooling air 14 discharged therefrom is discharged in a corresponding jet which may be used to advantage.

In the preferred embodiment illustrated in FIG. 2, the bypass aperture 58 is inclined radially through the seal support and is directed at the aft sleeve 52 for impingement cooling thereof.

In this way, the aft plenum 56 receives the cooling air 14 in parallel from both leakage through the labyrinth seals and from the bypass aperture 58, with the bypass air preferably impinging the aft sleeve 52 for enhancing the cooling effectiveness thereof without compromising performance of the labyrinth seals themselves.

Figure 3:
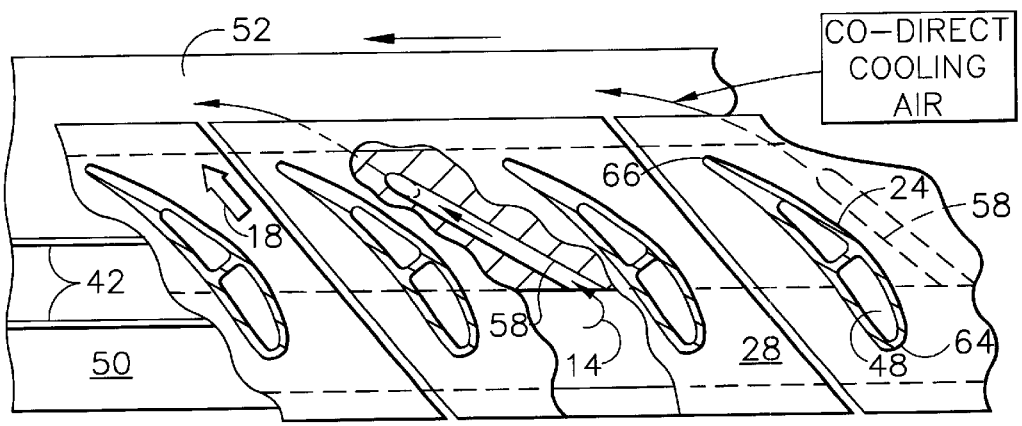
FIG. 3 is a partly sectional planiform view of the nozzle inner band illustrated in FIG. 1 and taken along line 3—3 showing a preferred inclination of the bypass aperture for co-directing cooling air therethrough in the direction of rotor rotation.

As shown in FIG. 3, the vanes 24 include circumferentially offset leading and trailing edges 64, 66 for discharging the combustion gases in part circumferentially, as well as axially in the downstream direction. And, the bypass aperture 58 is preferably inclined through the seal support circumferentially in a generally tangential direction to discharge the bypass air co-directionally with the discharged combustion gases in the same direction as the rotation of the turbine disks and seal rotor 40.

For example, the bypass aperture 58 may be circumferentially inclined relative to the axial axis of the engine at about 60°, or correspondingly about 30° in the aft direction from the circumferential hoop direction of the nozzle. This inclination of the bypass aperture 58 increases the tangential velocity of the discharge air therefrom, and correspondingly reduces the relative air temperature experienced by the aft sleeve 52 for providing additional cooling thereof. The inlet of the bypass aperture 58 is in the pocket defined between the inner band, web, and seal land wherein the relative temperature of the cooling air is coolest in this region.

In the preferred embodiment illustrated in FIG. 3, the turbine nozzle is formed in circumferential segments in a conventional manner, typically with two of the vanes 24 disposed in each nozzle segment in a common casting. The outer and inner bands 26,28 are correspondingly segmented and include suitable spline seals therebetween for minimizing any flow leakage therethrough. Similarly, the seal support is correspondingly segmented and includes suitable spline seals circumferentially therebetween for minimizing fluid leakage therebetween in a conventional manner.

Each of the inner band segments preferably includes at least one of the bypass apertures 58 therein for impingement cooling the aft seal sleeve 52 circumferentially therearound in the manner described above. The several bypass apertures 58 are similarly inclined through their corresponding segments of the seal support and collectively provide impingement cooling of the aft sleeve 52 around its circumference, while also providing cooling of the turbine components locally surrounding the aft plenum 56.

Illustrated schematically in FIGS. 2 and 3 is a corresponding block diagram representation of the improved method of cooling the interstage seal by bypassing a portion of the cooling air 14 through the seal support 44 to impinge the aft sleeve 52 portion of the interstage seal.

And, FIG. 3 illustrates schematically that the bypass air 14 channeled through the bypass aperture 58 is directed circumferentially around the aft sleeve 52 in co-direction with rotation of the aft rotor disk and attached seal rotor 40.

By the simple introduction of the bypass apertures 58, a minimum amount of cooling air may bypass the seal pads 46 to directly impinge the aft seal sleeve 52 for enhanced cooling thereof. Minimum bypass air is preferred for minimizing performance losses in the engine. The inherent pressure differential across the seal support is used to advantage to drive the bypass air therethrough to impingement cool the aft sleeve. The bypass apertures are advantageously located through the supporting web 60 for positioning their inlets in a local pocket directly below the nozzle inner band which receives the locally coolest cooling air.

By preferentially inclining the bypass apertures in the direction of rotor rotation, the jet velocity of the air discharged from the apertures is maintained for maximizing impingement cooling. The co-directional discharge of the bypass air experiences a corresponding decrease in relative temperature of the cooling air for more effectively cooling the aft sleeve. And, the co-directional inclination of the bypass apertures additionally reduces windage and parasitic turbine efficiency losses in that cooling air.

The bypass apertures are preferably formed as local apertures through the supporting web and land for the seal pad. Alternatively, the apertures may be in the form of individual tubes sealingly mounted through corresponding apertures formed in the seal support. Such tubes permit the retrofitting of existing turbine nozzles with the bypass apertures for improving interstage cooling performance.

The bypass apertures may therefore be introduced in any convenient manner and with any desired orientation, with and without inclination, where space permits for bypassing a portion of the cooling air around the seal pad without compromising performance of the labyrinth seals thereat.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A turbine nozzle comprising:
   a plurality of hollow stator vanes extending between outer and inner bands, and including a flow passage having an inlet in said outer band and an outlet in said inner band for channeling cooling air therethrough;
   a seal support extending from said inner band laterally therealong for supporting a seal pad; and
   a bypass aperture extending through said seal support with an inlet on a forward side of said seal support disposed in flow communication with said flow passage outlet for receiving said cooling air therefrom for bypass around said seal pad for discharge through an outlet disposed at an aft end of said seal pad.

2. A nozzle according to claim 1 wherein said seal support includes a web extending inwardly from said inner band, and wider seal land joined to said web and spaced from said inner band for supporting said seal pad therebelow, and said bypass aperture extends through said web and land to bypass said cooling air aft of said seal pad.

3. A nozzle according to claim 2 wherein said vanes include circumferentially offset leading and trailing edges for discharging combustion gases circumferentially, and said bypass aperture is inclined through said seal support to discharge said bypass air co-directionally with said combustion gases.

4. A nozzle according to claim 2 wherein said flow passage extends through said outer and inner bands for channelling said cooling air forward of said seal support, with said bypass aperture being sized to bypass a portion of said cooling air around said seal land.

5. A nozzle according to claim 2 further comprising said seal pad fixedly joined to said seal land forwardly of said bypass aperture.

6. A nozzle according to claim 2 in combination with an interstage seal rotor disposed radially inwardly of said seal land and pad thereon, said seal rotor including a plurality of seal teeth disposed adjacent to said seal pad for effecting labyrinth seals therewith for limiting flow of said cooling air therebetween, with said bypass aperture being disposed aft of said seal teeth for bypassing a portion of said cooling air around said labyrinth seals.

7. An apparatus according to claim 6 wherein said seal rotor further includes an annular forward sleeve extending axially from a forward one of said seal teeth, and an annular aft seal sleeve extending axially from an aft one of said seal teeth, and said bypass aperture is directed at said aft seal sleeve for impingement cooling thereof.

8. An apparatus according to claim 7 further comprising:
a forward rotor disk having a row of rotor blades extending outwardly therefrom, and joined in abutment with said forward seal sleeve; and
an aft rotor disk having a row of rotor blades extending outwardly therefrom, and joined in abutment with said aft seal sleeve.

9. An apparatus according to claim 8 wherein:
said forward seal sleeve is spaced inwardly from said seal pad to define a forward seal plenum for receiving said cooling air from said vanes; and
said aft seal sleeve is spaced inwardly from said seal pad to define an aft seal plenum for receiving said cooling air from both said labyrinth seals and said bypass aperture.

10. An apparatus according to claim 9 wherein:
said outer and inner bands include circumferential segments with two of said vanes disposed in each of said segments; and
each of said inner band segments includes said bypass aperture therein for impingement cooling said aft seal sleeve circumferentially therearound.

11. An apparatus according to claim 10 wherein said vanes include circumferentially offset leading and trailing edges for discharging combustion gases circumferentially, and said bypass apertures are inclined through said seal supports to discharge said bypass air co-directionally with said combustion gases.

12. An interstage seal comprising:
a turbine nozzle including hollow stator vanes extending between outer and inner bands, with corresponding outlets in said inner band for discharging cooling air, and a seal support extending from said inner band fixedly supporting a seal pad thereon;
a forward rotor disk having a row of rotor blades extending outwardly therefrom and disposed forwardly of said nozzle;
an aft rotor disk having a row of rotor blades extending outwardly therefrom and disposed aft of said nozzles;
an interstage seal rotor disposed radially inwardly of said seal pad, and including a plurality of seal teeth disposed adjacent to said seal pad for effecting labyrinth seals therewith; and
a plurality of bypass apertures extending through said seal support with inlets on a forward side of said seal support disposed in flow communication with said inner band outlets for receiving said cooling air therefrom for bypass around said seal pad and labyrinth seals for discharge through outlets disposed at an aft end of said seal pad and labyrinth seals.

13. A seal according to claim 12 wherein said seal rotor further comprises:
an annular forward seal sleeve extending axially from a forward one of said seal teeth in abutment with said forward rotor disk; and
an annular aft seal sleeve extending axially from an aft one of said seal teeth in abutment with said aft rotor disk.

14. A seal according to claim 13 wherein said seal support includes a web extending inwardly from said inner band, and wider seal land joined to said web and spaced from said inner band for supporting said seal pad therebelow, and said bypass apertures extend through said web and land to bypass said cooling air aft of said seal pad.

15. A seal according to claim 14 wherein said flow passage extends through said inner band for channelling said cooling air forward of said seal support, with said bypass apertures being sized to bypass a portion of said cooling air around said seal land.

16. A seal according to claim 15 wherein:
said inner band includes circumferential segments with two of said vanes disposed in each of said segments; and
each of said inner band segments includes said bypass aperture therein for impingement cooling said aft seal sleeve circumferentially therearound.

17. A seal according to claim 16 wherein said vanes include circumferentially offset leading and trailing edges for discharging combustion gases circumferentially, and said bypass apertures are inclined through said seal supports to discharge said bypass air co-directionally with said combustion gases.

18. In an interstage seal disposed radially inwardly of a turbine nozzle having hollow stator vanes extending between outer and inner bands, a stator seal pad mounted to a seal support mounted to said inner band and cooperating with labyrinth seal rotor teeth for limiting cooling airflow therebetween, a method of cooling said interstage seal comprising channeling cooling air through said vanes for discharge through said inner band on a forward side of said seal support, and bypassing a portion of said cooling air discharged through said inner band through said seal support at an aft end of said seal pad to impinge a portion of said interstage seal disposed radially inwardly of said seal support.

19. A method according to claim 18 wherein said interstage seal includes an aft seal sleeve extending from an aft one of said seal teeth to abut an aft rotor disk, and said cooling air bypasses said seal pad to impinge said aft seal sleeve.

20. A method according to claim 19 wherein said bypass air is directed circumferentially around said aft seal sleeve in co-direction with rotation of said aft rotor disk.

* * * * *